T. W. MELLOR.
Improvement in Apparatus for Roughening the Outer Surface of Glass-Globes.
No. 130,520.            Patented Aug. 13, 1872.
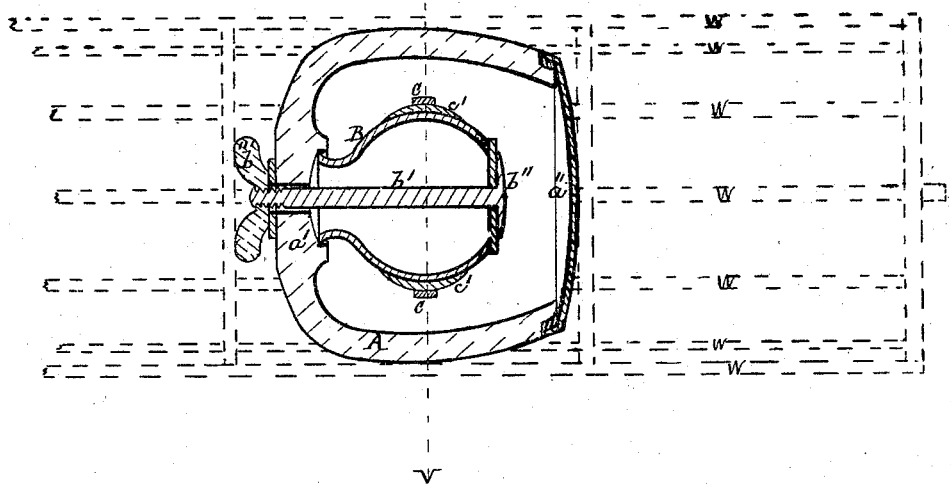
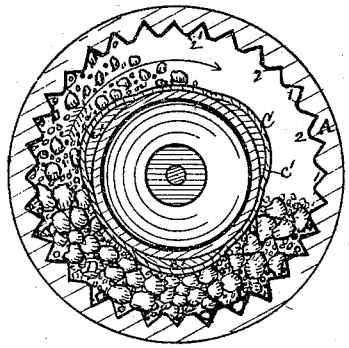
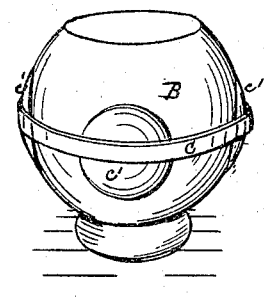
WITNESSES:            INVENTOR:

UNITED STATES PATENT OFFICE.

THOMAS W. MELLOR, OF PHILADELPHIA, PENNSYLVANIA.

IMPROVEMENT IN APPARATUS FOR ROUGHENING THE OUTER SURFACES OF GLASS GLOBES.

Specification forming part of Letters Patent No. 130,520, dated August 13, 1872.

Specification describing certain Improvements in the Process and Apparatus for Roughening the Outer Sides of Glass Globes and similar articles of glass, invented by THOMAS W. MELLOR, of the city of Philadelphia, in the State of Pennsylvania.

My invention relates to the vessel in which the outer sides or surfaces of glass globes or shades for lamps and similar articles of glass are roughened by the friction of gravel or sand and water, while the said glass and containing-vessel are in rotary motion; and my invention consists in the peculiar construction of the interior surface of the said containing-vessel, by corrugating or grooving and ridging the said interior in directions parallel with the axis of its rotation, the object of my invention being to prevent the sand and gravel from slipping on the inner side of the containing-vessel (and thus prolonging the operation and tending to produce lineal scratches around the globe) by giving the inner-side surface of the said containing-vessel such longitudinally-arranged ribs or ridges and grooves as will carry the sand and gravel up above the axis of the vessel and cause the same to impinge against that portion of the glass which is above the axis of motion, and at the same time prevent that portion which is below the axis from sliding against the glass.

Figure 1 is a longitudinal central section of one of the metal cases with a glass globe secured therein, having the disks and band applied thereto, the usual carrying-cylinder, which is well known to the trade, being indicated in section by dotted lines. Fig. 2 is a transverse section of the left-hand side of the dotted line $v$ $v$ of Fig. 1. Fig. 3 is a perspective view of the glass globe with the applied disks and band detached from the case.

The case A is a hollow shell of cast-iron, having V-shaped alternating longitudinal grooves and projections 1 2 around on its inner side. One end of the case is cast closed, and a small hole, $a'$, drilled or bored through its center, and the opposite end is cast open and subsequently fitted with a slip-cover, $a''$. The case is made large enough to readily permit the glass globe B to be introduced and secured firmly and concentrically within it by means of a broad-headed screw-bolt, $b'$, the head $b''$ of which covers the one open end of glass globe B, while the other end passes through the globe and the small hole $a'$, and receives upon it a screw-nut, $b'''$, whereby the globe B is clamped tightly in position, and the other open end of the same closed. The space left around between the globe B and the inner side of the case A should be about one inch, more or less, in thickness, for the reception and movements of the gravel, sand, and water, which should be in quantity sufficient to occupy about the lower third or fourth part of the whole space when first introduced.

When clear or smooth ornamental portions are desired to be left on the outside surface of the glass globe circular disks $c'$ $c'$ $c'$, or other forms or configurations of coverings, of sheet-metal or other suitable material are to be secured around the globe by means of the elastic band C. After the globe is fixed in place, and the gravel, sand, and water introduced, the cover $a''$ is to be applied over the open end of the case A, and a series of the latter inserted in the usual carrying-cylinder, (see dotted lines $w$ $w$ in Fig. 1,) and each secured by a wedge inserted between its covered end and the adjoining partition of the cylinder. Rotary motion is given to the carrying-cylinder until the outer side of the exposed glass is properly roughened, which operation occupies about sixty minutes, and therefore, if there be ten of the cases A with inclosed globes B, the apparatus will finish one globe per six minutes.

If it be desired to roughen the inner side of the glass article at the same time, all that will be necessary will be to place a proper quantity of the sand, gravel, and water required inside of said glass article before rotary motion is given to the carrying-cylinder.

I am aware that glass bells, &c., have been roughened or ground on their outer surfaces by subjecting them to the grinding action of sand and water in a keg rotated for the purpose. I therefore do not desire to claim, broadly, the process of grinding the outside of glass globes, &c., by rotary motion, in connection with sand and gravel in a containing-vessel; but

I claim as my invention—

The case A, whether the same be made of metal, wood, or other material, when provided with ridges and grooves 2 1, or their equivalents, arranged around the inner side of said case, substantially as and for the purpose hereinbefore set forth.

THOMAS W. MELLOR.

Witnesses:
BENJ. MORISON,
WM. H. MORISON.